United States Patent
Gupta et al.

(10) Patent No.: US 9,843,635 B2
(45) Date of Patent: Dec. 12, 2017

(54) DATA REPLICATION AMONG PORTABLE ELECTRONIC DEVICES

(71) Applicants: Keshav Gupta, Bangalore (IN); Hemanth Basrur, Bangalore (IN)

(72) Inventors: Keshav Gupta, Bangalore (IN); Hemanth Basrur, Bangalore (IN)

(73) Assignee: SYBASE INC, Dublin, CA (US)

(*) Notice: Subject to any disclaimer, the term of this patent is extended or adjusted under 35 U.S.C. 154(b) by 134 days.

(21) Appl. No.: 14/569,639

(22) Filed: Dec. 13, 2014

(65) Prior Publication Data
US 2016/0173591 A1    Jun. 16, 2016

(51) Int. Cl.
| | | |
|---|---|---|
| G06F 9/445 | (2006.01) | |
| H04L 29/08 | (2006.01) | |
| H04W 4/00 | (2009.01) | |
| G06F 9/44 | (2006.01) | |
| G06F 11/07 | (2006.01) | |

(52) U.S. Cl.
CPC ............ H04L 67/1095 (2013.01); G06F 8/00 (2013.01); G06F 8/61 (2013.01); G06F 11/07 (2013.01); H04L 67/34 (2013.01); H04W 4/001 (2013.01); H04W 4/003 (2013.01)

(58) Field of Classification Search
USPC .................. 235/380; 717/175, 176, 177, 178
See application file for complete search history.

(56) References Cited

U.S. PATENT DOCUMENTS

| | | | | |
|---|---|---|---|---|
| 2003/0116633 A1* | 6/2003 | Clayman | .............. | G06K 19/077 235/488 |
| 2006/0071084 A1* | 4/2006 | Detig | ............... | G06K 19/07749 235/492 |
| 2009/0106110 A1* | 4/2009 | Stannard | ................ | G06F 17/30 705/14.1 |
| 2009/0294543 A1* | 12/2009 | Varga | ..................... | G06K 19/02 235/492 |
| 2012/0072903 A1* | 3/2012 | Joukov | ..................... | G06F 8/63 717/175 |
| 2012/0117558 A1* | 5/2012 | Futty | ................... | G06F 9/44505 717/176 |
| 2014/0282493 A1* | 9/2014 | Glover | ..................... | G06F 8/61 717/176 |

* cited by examiner

*Primary Examiner* — Daniel Hess

(57) ABSTRACT

Various embodiments of systems and methods for replicating data included in a portable electronic device to a new portable electronic device are described herein. Initially a copy of data, including an application, stored in the portable electronic device is generated. Next a determination is made whether the application is included in an application distribution platform corresponding to an operating system of the new portable electronic device. Finally based on the determination, the application is downloaded from the application distribution platform to the new portable electronic device.

14 Claims, 5 Drawing Sheets

DATA REPLICATION AMONG PORTABLE ELECTRONIC DEVICES

BACKGROUND

Portable electronic devices, for example, cellular or satellite telephones, laptop computers, personal digital assistants, electronic book readers, and the like, are rapidly evolving in the past few years. Every few months a new portable electronic device with additional features than the previous version is available on market. Typically, users would like to use the device with the latest features. However, changing the portable electronic devices usually requires a user to manually replicate the data stored in the old device of the user to the new device, which could be cumbersome.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for replicating data among portable electronic devices are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
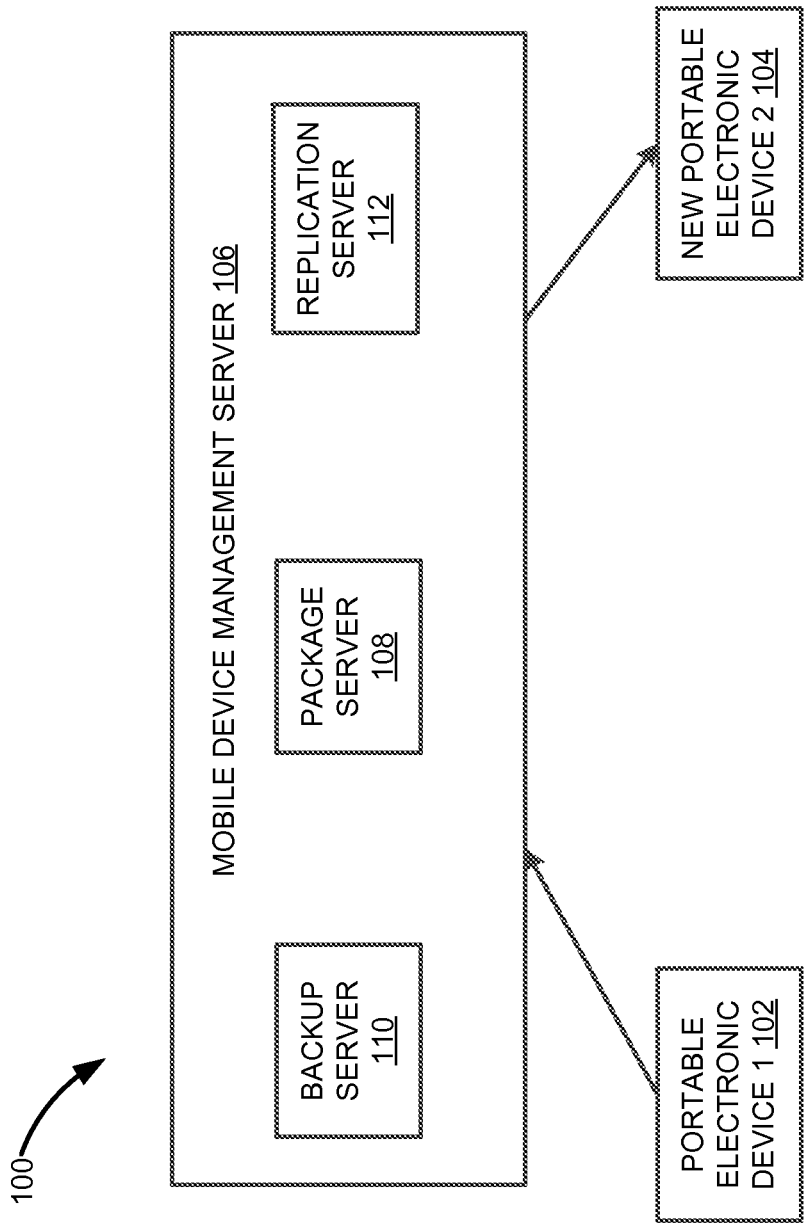
FIG. 1 is a block diagram illustrating an exemplary system for replicating data among portable electronic devices, according to an embodiment.

FIG. 1 is an exemplary block diagram illustrating system 100 for replicating data of portable electronic device 1 102 to a new portable electronic device 2 104, according to an embodiment. The portable electronic device 1 102 may include data, for example, contacts, videos, photos, calendar details, and call history of a user of the portable electronic device 1 102, etc. The data on the portable electronic device 1 102 may also include applications, for example business applications, games, etc., which the user may have downloaded to the portable electronic device 1 102. The new portable electronic device 2 104 may be a device to which the data of the portable electronic device 1 102 is to be replicated. The portable electronic devices 1 102 and 2 104 may be cellular or satellite telephones, laptop computers, personal digital assistants, electronic book readers, wearable devices such as smart watches, intelligent eyewear, etc.

In one embodiment, mobile device management (MDM) server 106 may be used for replicating data of the portable electronic device 1 102 to the new portable electronic device 2 104. The MDM server 106 may include package server 108 that receives application metadata, for example application name, of applications downloaded to the portable electronic device 1 102. The MDM server 106 may also include backup server 110 that receives data other than applications, for example, contacts, videos, photos, calendar details, and call history data of a user of the portable electronic device 1 102. Further, the MDM server 106 also includes replication server 112 that replicates the data included in the portable electronic device 1 102 to the new portable electronic device 2 104.

For replicating the application included in the portable electronic device 1 102 to the new portable electronic device 2 104, the replication server 112 determines whether the new portable electronic device 2 104 has a different operating system than the portable electronic device 1 102. In case the operating system of the portable electronic device 1 102 and the new portable electronic device 2 104 are different, then the replication server 114 searches, e.g., in an application distribution platform, for a similar application corresponding to the operating system of the new portable electronic device 2 104.

For example, consider that the portable electronic device 1 102 has a "Market Watch" application. The operating system of the portable electronic device 1 102 is "XX". The "Market Watch" application is to be replicated to the new portable electronic device 2 104 that has an operating system "YY". The replication server 112 searches an application distribution platform corresponding to the operating system "YY" to determine whether the platform includes the "Market Watch" application. In case the platform includes the "Market Watch" application then the application is downloaded to the new portable electronic device 2 104 from the platform.

In one embodiment, the application distribution platform is an application store (or app store), which allows users to browse through different application categories, view information about the different applications, and select the application that the user wants to download to a portable electronic device. An application is a self-contained program that is designed to perform a particular function. The application may, for example, be an enterprise application.

In one embodiment, the data received at the backup server 110, for example, contacts, Short Message Service (SMS), call history, calendar information, media, are replicated by converting these data into messages corresponding to a pre-defined message format. For example, the contacts and the SMS, included in the data, are converted to messages in a comma-separated values (CSV) format and extensible markup language (XML) format, respectively. The calendar information is converted to a message in an iCalendar format. In one embodiment, the data received at the backup server 110 are converted to a message in a message format that is compatible with the new portable electronic device 2 104. The converted messages are then forwarded to a replication server 112 that then forwards these messages, including contacts, SMS, calendar information, and call history, to the new portable electronic device 2 104. Thus, the MDM server 106 replicates data of different types, for example, contacts, SMS, call history, applications from the portable electronic device 1 102 to the new portable electronic device 2 104. Further, the MDM server 106 also replicates applications among portable electronic devices that have different operating systems.

Figure 2:
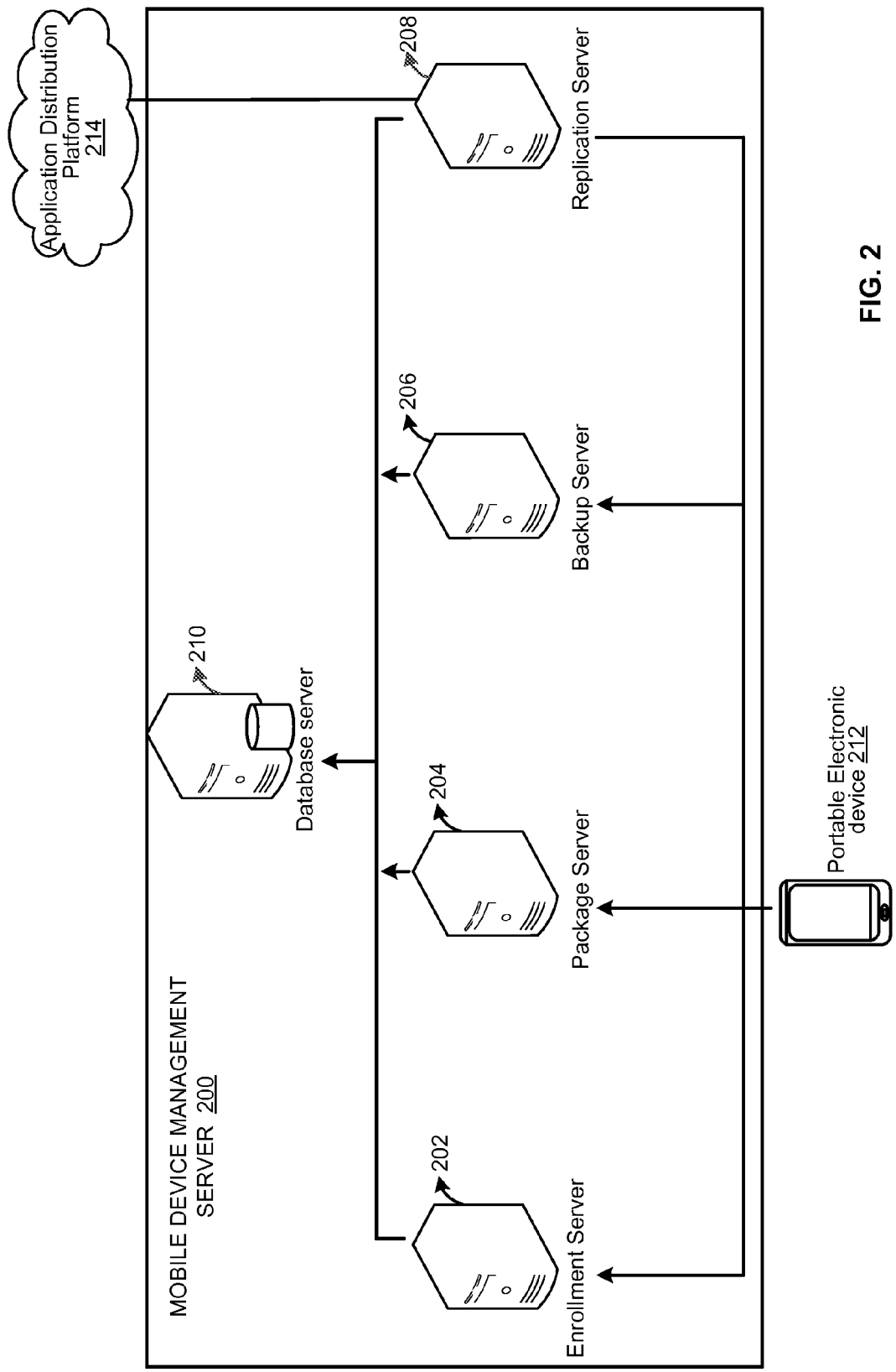
FIG. 2 is a block diagram illustrating a mobile device management (MDM) server for replicating data among portable electronic devices, according to an embodiment.

FIG. 2 is a block diagram illustrating mobile device management (MDM) server 200 for replicating data between portable electronic devices, according to an embodiment. The MDM server 200 includes an enrollment server 202, a package server 204, a backup server 206, a replication server 208, and a database server 210. An enrollment server 202 provides services that enable a portable electronic device 212 to be registered with the MDM server 200. In one embodiment, the enrollment server 202 registers a portable electronic device 212 with a unique identifier, for example, a telephone number, a subscriber identity module (SIM) number, etc. The mapping of the device 212 and the unique identifier is then stored in a database server 210. In one embodiment, enrolling the device includes enrolling an International Mobile Equipment Identity (IMEI) number of the device 212 with a unique identifier. The IMEI number is a unique number assigned to a device. The mapping between the IMEI number of the device 212 and the unique identifier is stored in the database server 210.

The MDM server 200 also includes a package server 204 that delivers applications to the portable electronic device 212 and maintains application metadata of applications installed at the portable electronic device 212. The application metadata may include, for example, a bundle ID of the application, a version number of the installed application, and an application distribution platform from which the application is downloaded. A bundle ID is a unique identifier of an application that is used during the development process to provision devices and by the operating system when the application is distributed. In one embodiment, the package server 204 sends a mapping of the device 212 and the application metadata of the applications downloaded to the device 212 to a database server 210. The mapping information may include an IMEI number of the device 212, a unique identifier of the device 212, and the application metadata of the applications downloaded by the portable electronic device 212.

Data other than applications, for example, SMS, call history, contacts, browsing history, are received by a backup server 206 that then forwards this data to the database server 210. In one embodiment, the backup server 206 may provide the different data options, for example, SMS, contacts, call history, which may be backed up to a user. The user may then select one or more of these data options depending on the data for which the user wants to create a data copy. For example, the user may select the data option SMS. In this case a data copy of only SMS is created. The created data copy is then stored in the database server 210.

The MDM server 200 also includes a replication server 208 that replicates the data of the portable electronic device 212 to a new portable electronic device (not shown). For replicating the data received by the backup server 206, the enrollment server 202 converts the data into a message in a pre-defined message format. The enrollment server 202 may then forward the message, including the data received by the backup server 206, to a replication server 208. For example, the enrollment server 202 converts the contacts to a message in a CSV file, SMS and call history to a message in a XML format, media such as photos, songs, and videos to a message in a binary stream format, and calendar information to a message in an iCalendar format. The enrollment server 202 then forwards these messages to the replication server 208.

The replication server 208 forwards the received messages, which include the contacts, SMS, call history, and calendar data, to the new portable electronic device that has to receive the replicated data. The replication server 208 is also in communication with an application distribution platform 214. The replication server 208 may communicate with several application distribution platforms corresponding to different operating systems. In one embodiment, the application distribution platform 214 is a cloud-based application distribution platform. The replication server 208 searches for the applications downloaded by the portable electronic device 212 in the application distribution platform 214. Based on the search, an application, similar to the application downloaded by the portable electronic device 212, is identified. The identified application is then downloaded from the application distribution platform 214 to the new portable electronic device.

Figure 3:
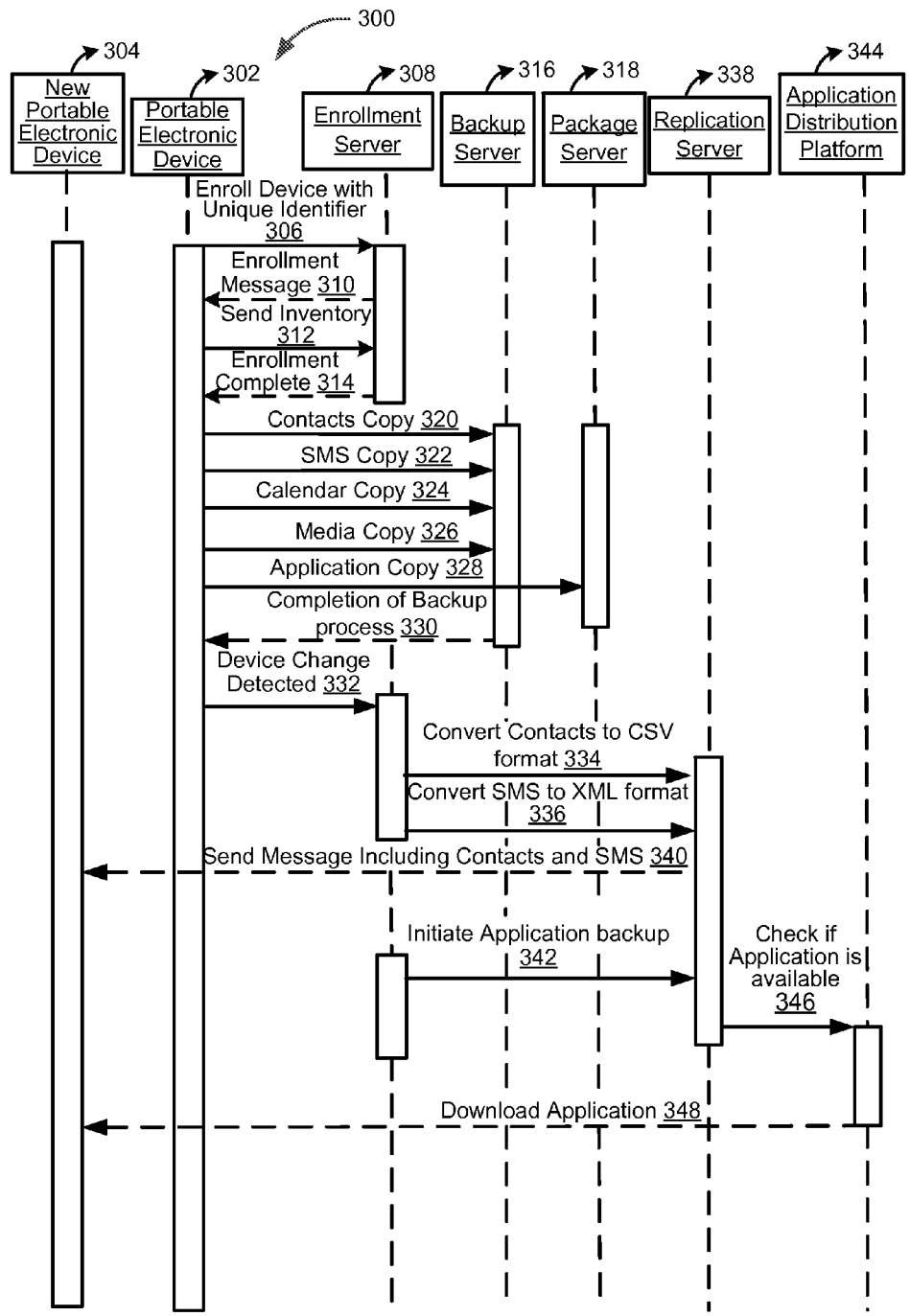
FIG. 3 is a sequence flow diagram illustrating a process for replicating data among portable electronic devices, according to an embodiment.

FIG. 3 is a sequence flow diagram illustrating process 300 for replicating data from a portable electronic device 302 to a new portable electronic device 304, according to an embodiment. Initially the portable electronic device 302 sends a request 306 to an enrollment server 308 for enrolling the portable electronic device 302 with a unique identifier, for example, a telephone number. For enrolling the device, the portable electronic device 302 may provide an IMEI number of the portable electronic device 302 and an unique identifier, for example, a telephone number, to the enrollment server 308. The enrollment server 308 may then store the mapping of IMEI number and the unique identifier of the portable electronic device 302 at a database server. After the device is enrolled, the enrollment server 308 sends an enrollment message 310 to the portable electronic device 302 indicating that the portable electronic device is enrolled at the MDM server. Next the portable electronic device 302 sends inventory information 312 related to the portable electronic device 302 to the enrollment server 308. The inventory information includes device information, for example, an IMEI number, available memory at the device, and mobile carrier information. In one embodiment, the mobile carrier information is information related to the mobile carrier that provides connectivity to the portable electronic device 302. After receiving the inventory information the enrollment server 308 sends a message 314 to the portable electronic device 302 to indicate the completion of enrollment process.

Next the portable electronic device 302 initiates a data backup at pre-defined time intervals. For initiating the data backup, the backup server 316 and package server 318 receive a copy of the data included in the portable electronic device 302. The copy of data received by the backup server 316 may include, for example, a contacts copy 320, SMS copy 322, calendar copy 324, and media copy 326. The copy of data received by the package server 328 may include, for example, an application copy 328. The backup server 316 and package server 318 then stores the received copy of data to the database server. In one embodiment, the generation of data copy 320, 322, 324, and 328 may be initiated by the backup server 316. The backup server 316 may provide the different data options for which a copy is to be generated, to a user. Next a copy is created for the data options selected by a user. For example, the data options may be contacts, SMS, calendar, and media. In case the user selects the contacts and calendar data options then a copy of only the contacts copy 320 and calendar copy information 324 is generated. In one embodiment, the generation of a copy of the applications 328 is initiated by a package server 318. The package server 318 then stores this information to the backup server. After the data copy is generated and stored in the backup server a message 330 may be sent to the portable electronic device 302 indicating completion of the backup process.

In one embodiment, the enrollment server 308 checks whether a portable electronic device 302 with respect to a unique identifier, with which it was enrolled, has changed. In case the enrollment server 308 detects a device change 332 then the unique identifier may be mapped to a new portable electronic device 304 instead of the portable electronic device 302 with which it is enrolled. For example, consider that an IMEI number of a portable electronic device 302 is enrolled with a unique identifier, which is a telephone number assigned to a SIM inserted in the portable electronic device 302. When the SIM is removed from the portable electronic device 302 and inserted in a new portable electronic device 304, the enrollment server 308 detects that the unique identifier is mapped to an IMEI number of a new portable electronic device 304. The enrollment server 308 then initiates a data replication process to replicate the data copy, stored at the database server, to the new portable electronic device 304. In one embodiment, the enrollment server sends a request to the new portable electronic device 304 to receive device type information of the new portable electronic device 304. The device type information may include information about the operating system of the new portable electronic device 304. Based on the received request the new portable electronic device 304 may send the device type information to the enrollment server 308.

Next, for replicating the data to the new portable electronic device 304, the enrollment server 308 converts the data received by the backup server 316 in a message corresponding to a pre-defined message format. For example, the enrollment server 308 may convert the contacts to a message in a CSV format 334 and the SMS to a message in a XML format 336. After or during the conversion, the enrollment server 308 sends the message or messages, obtained after the conversion, to the replication server 338. The replication server 338 then sends 340 the messages, including the contacts and the SMS, to the new portable electronic device 304. The enrollment server 334 then initiates an application backup 342 to replicate the applications included in the portable electronic device 302. For replicating the applications, the enrollment server 308 communicates with an application distribution platform 344 to check 346 whether the application distribution platform 344 includes the application that is to be replicated. In case the application is included in the application distribution platform 344, then the application is downloaded 348 from the application distribution platform 344 to the new portable electronic device 304.

Figure 4:
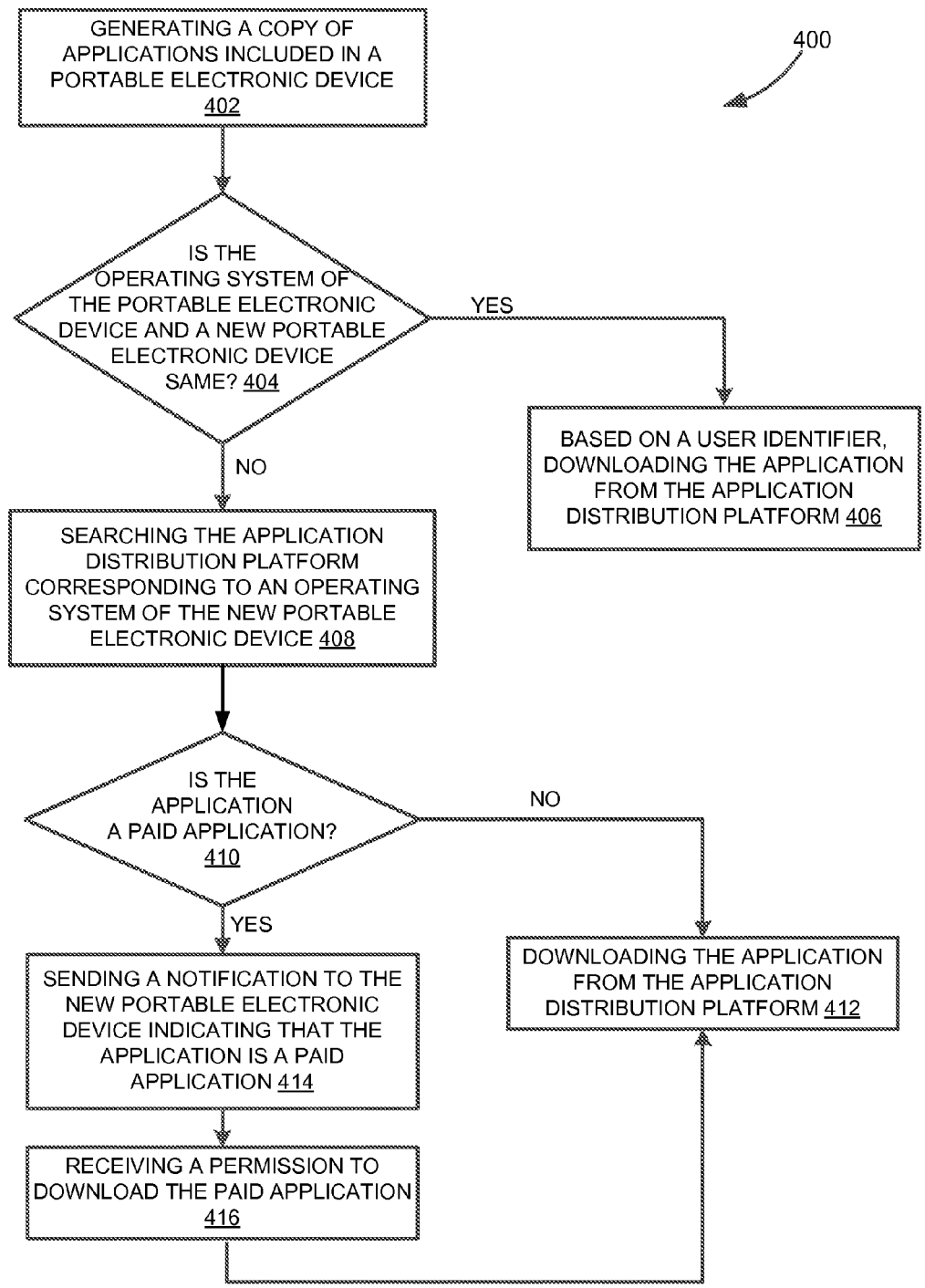
FIG. 4 is a flow diagram illustrating a process for replicating data among portable electronic devices, according to an embodiment.

FIG. 4 is a flow diagram illustrating process 400 for replicating application data from a portable electronic device to a new portable electronic device, according to an embodiment. Initially a copy of the applications included in the portable electronic device is generated (402). The data of the portable electronic device is to be replicated to the new portable electronic device. In one embodiment, a check is performed to determine whether the operating system of the portable electronic and the new portable electronic device is same (404). An operating system (OS) is software that manages computer hardware and software resources and provides services for computer programs. For example, the operating system may be iOS™ provided by Apple Inc. of Cupertino, USA.

In case the operating system of the portable electronic device and the operating system of the new portable electronic device are same, then the application is downloaded from an application distribution platform based on user identification information (406). For example, consider that the user downloads an application "Market Analytics" on the portable electronic device from an application distribution platform "application market". For downloading this information on portable electronic device, the user provides user identification information, for example, a user name and password, or an employee number assigned to the user. For replicating the "Market Analytics" application on a new portable electronic device the user only needs to provide user identification information. Based on the received user identification information, the application is downloaded from the "application market" to the new portable electronic device.

In case the operating systems of the portable electronic device and the new portable electronic device are different, then a search is performed at the application distribution platform corresponding to the operating system of the new portable electronic device (408). In one embodiment, the search is performed to identify an application in the application distribution platform that is same as the application downloaded at the portable electronic device. To identify a similar application, the replication server may perform a spelling or phonetic sound based search on the title of applications in the application distribution platform to identify an application with same spelling or same phonetic sound as the title of application that is to be replicated. In case a match is not found then the replication server searches the application distribution platform to identify an application developed by the same company as the application downloaded at the portable electronic device. Further, the replication server also searches for application description of the applications in the application distribution platform. An application may have a corresponding application description that provide details, such as, application features, the application type, for example, gaming application, business application, etc., and other details related to the application. The replication server searches the application description of the different applications to identify whether any of these applications have their description or a portion of their description same as the description of the application that is to be replicated.

In one embodiment, the replication server determines a percentage similarity score which is a score of the similarity between the application that is to be replicated and the different applications included in the application distribution platform. The application with the highest similarity score is then selected as the application that is to be downloaded to the new portable electronic device. In one embodiment, application that has a similarity score above a pre-determined value, for example seventy percent are only selected for downloading to the new portable electronic device.

Next, a check is performed to identify whether the application, obtained after searching the application distribution platform, is a paid application (410). A paid application is an application where a user is allowed to download an application only after making an online payment. In case the application is not a paid application then the application is downloaded from the application distribution platform corresponding to an operating system of the new portable electronic device (412). In case the application is a paid application then the replication server sends a notification to the new portable electronic device that the application is a paid application (414). Next when permission is received to download the paid application (416) then the application is downloaded from the application distribution platform (412).

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
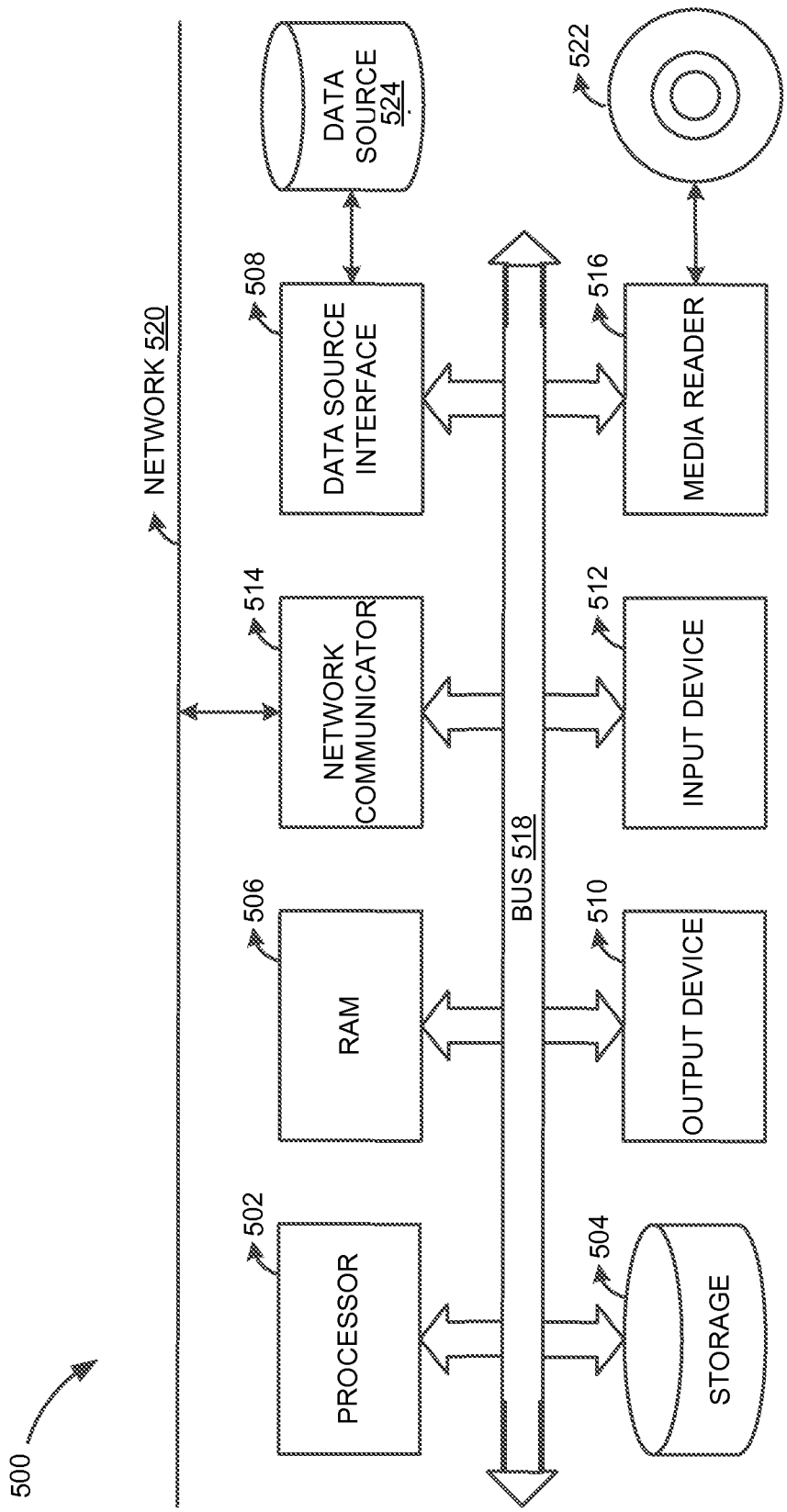
FIG. 5 is a block diagram illustrating a computing environment for replicating data among portable electronic devices, according to an embodiment.

FIG. 5 is a block diagram of an exemplary computer system 500. The computer system 500 includes a processor 502 that executes software instructions or code stored on a computer readable storage medium 522 to perform the above-illustrated methods of the invention. The computer system 500 includes a media reader 516 to read the instructions from the computer readable storage medium 522 and store the instructions in storage 504 or in random access memory (RAM) 506. The storage 504 provides a large space for keeping static data where at least some instructions could be stored for later execution. The stored instructions may be further compiled to generate other representations of the instructions and dynamically stored in the RAM 506. The processor 502 reads instructions from the RAM 506 and performs actions as instructed. According to one embodiment, the computer system 500 further includes an output device 510 (e.g., a display) to provide at least some of the results of the execution as output including, but not limited to, visual information to users and an input device 512 to provide a user or another device with means for entering data and/or otherwise interact with the computer system 500. Output devices 510 and input devices 512 could be joined by one or more additional peripherals to further expand the capabilities of the computer system 500. A network communicator 514 may be provided to connect the computer system 500 to a network 520 and in turn to other devices connected to the network 520 including other clients, servers, data stores, and interfaces, for instance. The modules of the computer system 500 are interconnected via a bus 518. Computer system 500 includes a data source interface 508 to access data source 524. The data source 524 can be accessed via one or more abstraction layers implemented in hardware or software. For example, the data source 524 may be accessed by network 520. In some embodiments the data source 524 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for replicating data included in a portable electronic device to a new portable electronic device, the method comprising:
    generating, by a processor of a computer, a copy of data including an application, installed on the portable electronic device;
    based on a mapping of a unique identifier and an international mobile equipment identity (IMEI) number, detecting, by the processor of the computer, a device change, wherein the device change corresponds to the new portable electronic device;
    identifying, by the processor of the computer, an operating system of the new portable electronic device;
    based on the identified operating system, determining, by the processor of the computer, whether the application is included in an application distribution platform of the identified operating system of the new portable electronic device, wherein an operating system of the portable electronic device is different from the operating system of the new portable electronic device; and
    based on the determination, initiating, by the processor of the computer, a replication of the data, wherein the replication of the data includes downloading the application from the application distribution platform to the new portable electronic device.

2. The computer implemented method according to claim 1, wherein the determination of whether the application is included in the application distribution platform corresponding to the operating system of the new portable electronic device comprises: based on metadata of the application, searching, by the processor of the computer, the application in the application distribution platform corresponds to the identified operating system.

3. The computer implemented method according to claim 1, further comprising:
    determining, by the processor of the computer, whether the application is paid application;
    when the determined application is paid application, sending, by the processor of the computer, a notification to the new portable electronic device indicating that the determined application is paid application; and
    based on the notification, receiving, by the processor of the computer, a message indicating a permission to download the application.

4. The computer implemented method according to claim 1, further comprising: enrolling, by the processor of the computer, at an enrollment server of a mobile device management server, the portable electronic device with the unique identifier.

5. The computer implemented method according to claim 1, further comprising:
    converting, by the processor of the computer, the data into a message corresponding to a pre-defined message format; and
    forwarding, by the processor of the computer, the message to the new portable electronic device.

6. A non-transitory computer-readable storage medium to store instructions, which when executed by a computer, cause the computer to perform operations comprising:
    generate a copy of data including an application, installed on a portable electronic device;
    based on a mapping of a unique identifier and an international mobile equipment identity (IMEI) number, detect a device change, wherein the device change corresponds to the new portable electronic device;
    identify an operating system of the new portable electronic device;
    based on the identified operating system, determine whether the application is included in an application distribution platform of the identified operating system of the new portable electronic device, wherein an operating system of the portable electronic device is different from the operating system of the new portable electronic device; and
    based on the determination, initiate a replication of the data, wherein the replication of the data includes download the application from the application distribution platform to the new portable electronic device.

7. The non-transitory computer readable storage medium according to claim 6, further comprises instructions which when executed by the computer further causes the computer to: based on an application metadata of the application, search the application in the application distribution platform corresponds to the identified operating system.

8. The non-transitory computer readable storage medium according to claim 6, further comprises instructions which when executed by the computer further causes the computer to:
    determine whether the application is paid application;
    when the determined application is paid application, sending a notification to the new portable electronic device indicating that the determined application is paid application; and
    based on the notification, receiving a message indicating a permission to download the application.

9. The non-transitory computer readable storage medium according to claim 6, further comprises instructions which when executed by the computer further causes the computer to: enroll, at an enrollment server of a mobile device management server, the portable electronic device with the unique identifier.

10. The non-transitory computer readable storage medium according to claim 6, further comprises instructions which when executed by the computer further causes the computer to:
    convert the data into a message corresponding to a pre-defined message format; and
    forward the message to the new portable electronic device.

11. A computer system for replicating data included in a portable electronic device to a new portable electronic device, the computer system comprising:
    a processor to execute a program code; and
    a memory coupled to the processor, the memory storing the program code comprising:
        generate a copy of data including an application, installed on a portable electronic device;

based on a mapping of a unique identifier and an international mobile equipment identity (IMEI) number, detect a device change, wherein the device change corresponds to the new portable electronic device;

identify an operating system of the new portable electronic device;

based on the identified operating system, determine whether the application is included in an application distribution platform of the identified operating system of the new portable electronic device, wherein an operating system of the portable electronic device is different from the operating system of the new portable electronic device; and based on the determination, initiating a replication of the data, wherein the replication of the data includes download the application from the application distribution platform to the new portable electronic device.

12. The computer system according to claim 11, wherein the program code further comprises: based on an application metadata of the application, search the application in the application distribution platform corresponds to the identified operating system.

13. The computer system according to claim 11, wherein the program code further comprises:

determine whether the application is paid application;

when the determined application is paid application, sending a notification to the new portable electronic device indicating that the determined application is paid application; and based on the notification, receiving a message indicating a permission to download the application.

14. The computer system according to claim 11, wherein the program code further comprises: enroll, at an enrollment server of a mobile device management server, the portable electronic device with the unique identifier.

* * * * *